INCREMENTAL ADDITION ARYLENE SULFIDE REACTANTS

United States Patent Office 3,790,536
Patented Feb. 5, 1974

3,790,536
ARYLENE SULFIDE POLYMER PROCESS
Fernando C. Vidaurri, Jr., Bartlesville, Okla., assignor to
Phillips Petroleum Company
Filed Sept. 18, 1972, Ser. No. 289,863
Int. Cl. C08g 25/00
U.S. Cl. 260—79.1                6 Claims

ABSTRACT OF THE DISCLOSURE

A process for increasing the production capacity of an arylene sulfide polymer process is described wherein incremental quantities of an arylene halide reactant are added to an alkali metal sulfide reactant in the presence of a polar organic compound under suitable process conditions to provide maximum production rates for arylene sulfide polymers at moderate reaction temperatures and pressures.

---

Figure 1:
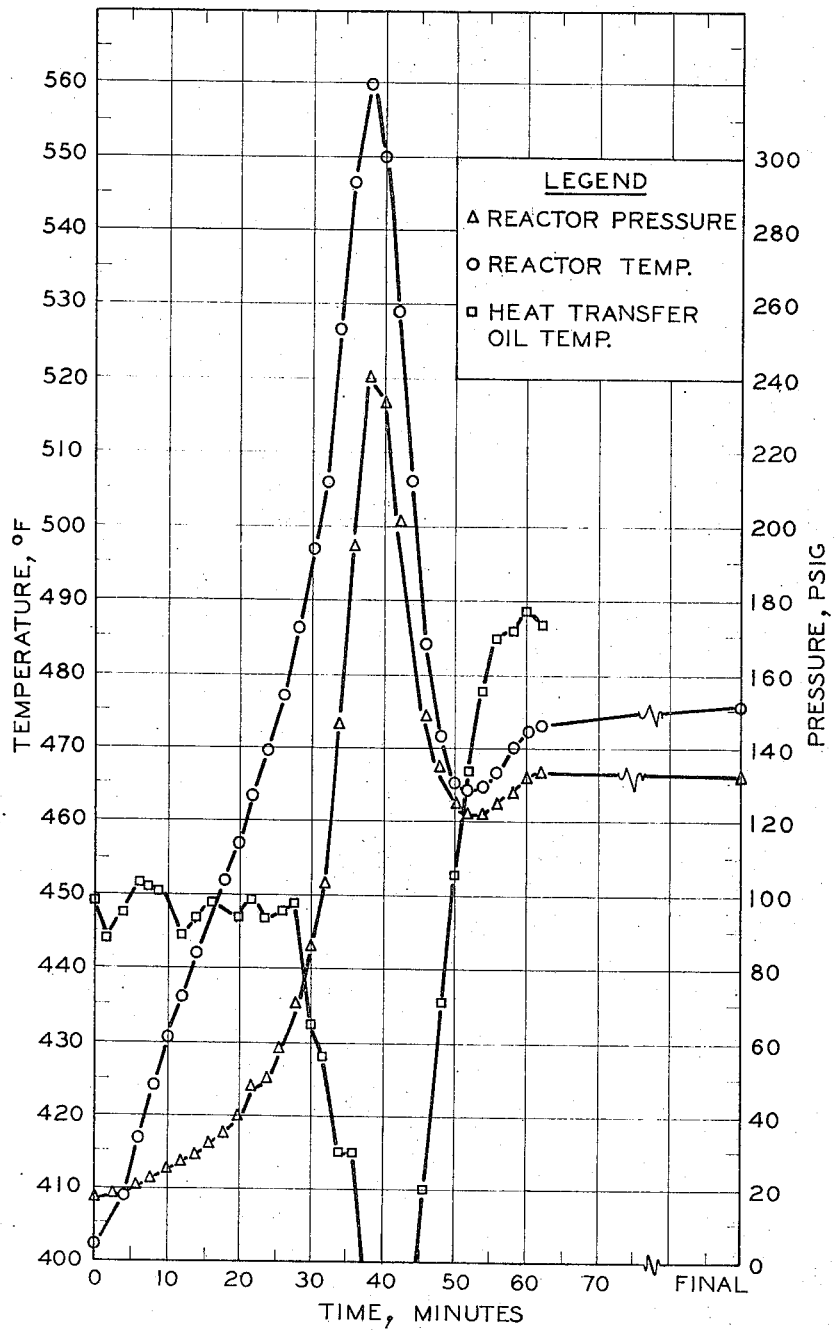

This invention relates to an improved process for the preparation of arylene sulfide polymers.

Various processes are known for the preparation of arylene sulfide polymers including among others those described by J. T. Edmonds in U.S. 3,354,129, issued Nov. 21, 1967. To date a generally preferred process for the production of arylene sulfide polymers comprises reacting at least one polyhalo-substituted aromatic compound wherein halogen atoms are attached to ring carbon atoms (arylene halide) with an alkali metal sulfide in the presence of a polar organic compound at an elevated temperature for a time sufficient to obtain an arylene sulfide polymer, under reaction conditions wherein the polar organic compound employed is a material that will substantially disperse both the alkali metal sulfide reactant and the polyhalo-substituted aromatic reactant. In the practice of the prior art process it has been found that preparation of arylene sulfide polymers at moderate reaction pressures and suitable reaction rates and temperatures is difficult to maintain and control. Contributing to this difficulty is the exothermic nature of the arylene sulfide polymer formation as well as the release to the reaction media of one mol of water for each recurring unit of arylene sulfide monomer present in the arylene sulfide polymer product. As the arylene sulfide polymer process proceeds to completion, the continuous release of the exothermic heat of reaction plus water to the reaction medium significantly contributes to undesirably high reaction pressures which deleteriously restricts arylene sulfide polymer production rates.

It is an object of this invention to prepare arylene sulfide polymers at moderate reaction pressures. Another object is to prepare arylene sulfide polymers at desirable reaction temperatures without reducing arylene sulfide polymer production rates. Still another object is to increase the rate of arylene sulfide polymer production. Another object is to increase the plant capacity of arylene sulfide polymer production facilities by employment of the process of the invention described herein. These and other objects will be apparent from the written description, the drawings, and the appended claims.

In accordance with this invention, an improved process for the production of arylene sulfide polymers comprises contacting an alkali metal sulfide with incremental quantities of an arylene halide reactant wherein said contact is carried out in the presence of a polar organic compound.

The process of this invention can be carried out by any process sequence which at least provides for incremental quantities (incremental quantities is defined herein as any quantity of either reactant which in relation to the other reactant is added to the other reactant in at least two increments, each increment being an amount less than the stoichiometric mole requirements for complete conversion of other reactant to arylene sulfide polymer) of either the arylene halide reactant or the alkali metal sulfide to contact the other reactant in the presence of a polar organic compound. In accord with the inventive process, advantageously, the reaction temperature and/or pressure can be suitably and conveniently controlled by varying either or both the quantity and rate of addition of at least one of the arylene sulfide polymer reactants with respect to the other. Selectively heating and/or cooling of the reaction medium in conjunction with controlling the incremental quantities and/or rates of reactant contact can also advantageously be employed. The means employed to control incremental additions of at least one of the reactants to the other reactant in order to control the temperatures and/or pressures within the reaction medium can be carried out by any means known to the art, and can be carried out in association with any suitable pressure and temperature sensing devices.

In accordance with this invention any incremental amount of reactant and any rate of addition thereof to the other reactant can be employed which effectively reduces the operating process pressure maximums to values lower than the ultimate pressure maximums associated with non-incremental addition of the same reactants to each other under otherwise similar reaction conditions. In general, the proportions of the limiting incrementally added reactant to the other reactant can vary widely. Generally, suitable mole proportions of limiting reactant, e.g., an alkali metal sulfide to the other reactant, e.g., an arylene halide, are within the range of from about 1:10 to about 1:2, preferably from about 1:5 to about 1:3. More preferably, the initial increment is within the range of from about 1:5 to about 1:3, with subsequently added increments being within the range of from about 1:4 to 1:3.

In general, the total reaction time period and the rate of addition of the reactant added in incremental quantities can vary widely. Total reaction time periods can vary from time periods as small as 1 minute to time periods of as much as a week or more. The rate of incremental addition, i.e., the time interval between each incremental quantity of reactant added to the reaction medium, can vary from time period intervals as small as $\frac{1}{10}$ of a minute to time intervals as much as 24 hours. Presently preferred rates of incremental addition are within the time period interval range of from about 30 minutes to about 60 minutes, more preferably from about 15 minutes to about 30 minutes.

In general, any process temperature at which alkali metal sulfides and arylene halides react can be employed. Generally, reaction temperatures of at least about 400° F. are required to promote commercially attractive production rates.

In general, any operating process pressure maximum can employed. In the preparation of a presently preferred arylene sulfide polymer, i.e. polyphenylene sulfide, the operating reaction pressures are limited to pressures within the range of from about 0 p.s.i.g. to about 300 p.s.i.g., preferably from about 0 p.s.i.g. to about 200 p.s.i.g., and more preferably from about 0 p.s.i.g. to about 160 p.s.i.g.

In general, the mole proportion of arylene sulfide polymer to polar solvent can vary widely. Mole proportions of arylene sulfide:polar solvent within the range of from about 0.1:1 to about 1:0.1 are useful. Preferably, the arylene sulfide:polar solvent ratio is maximized, e.g., 0.25:1 to 0.5 to 1, or even higher since the practice of this invention permits increased arylene sulfide polymer production rates while maintaining or reducing the polar solvent requirements comparative with prior art processes while conveniently maintaining reaction temperatures and pressures. Additionally, the process is preferably carried out in the presence of solvents which at reaction temperatures and pressures solvate maximum quantities of the arylene sulfide polymer as formed.

The arylene sulfide polymers may be recovered as relatively pure or high purity product from the reaction media which comprises arylene sulfide polymer:polar solvent: alkali metal salt by-product and other impurities by flashing of the solvent from the polymer.

Any alkali metal sulfide can be employed that can be represented by the formula $M_2S$ wherein M is an alkali metal selected from the group consisting of sodium, potassium, lithium, rubidium and cesium, including the anhydrous and hydrated forms of alklai metal sulfides. Generally preferred reactants are alkali metal sulfide polyhydrates, e.g., $Na_2S \cdot 6H_2O$, $K_2S \cdot 5H_2O$, $Rb_2S \cdot 4H_2O$, $$CsS_2 \cdot 4H_2O$$

which can be readily dehydrated to alkali metal sulfide monohydrates, e.g. $Na_2S \cdot H_2O$, $K_2S \cdot H_2O$, $Rb_2S \cdot H_2O$, by heating to elevated temperatures, e.g., approximately 400° F., in the presence of a polar organic compound, e.g., N-methylpyrrolidone at atmospheric pressures. Since dehydration of alkali metal sulfide polyhydrates, such as a presently preferred sodium sulfide reactant, to a hydrate form of less than 1 mol of water per mol of alkali metal sulfide is often difficult and/or uneconomical, presently it is preferred that alkali metal sulfide reactants contain about 1 mol of water of hydration.

Any polyhalo-substituted aromatic compound (arylene halide) can be employed, including the broad group of primary reactants, incorporated herein by reference, described in Edmonds, U.S. 3,354,129, issued Nov. 21, 1967. Generally preferred polyhalo-substituted compounds are represented by the formulas:

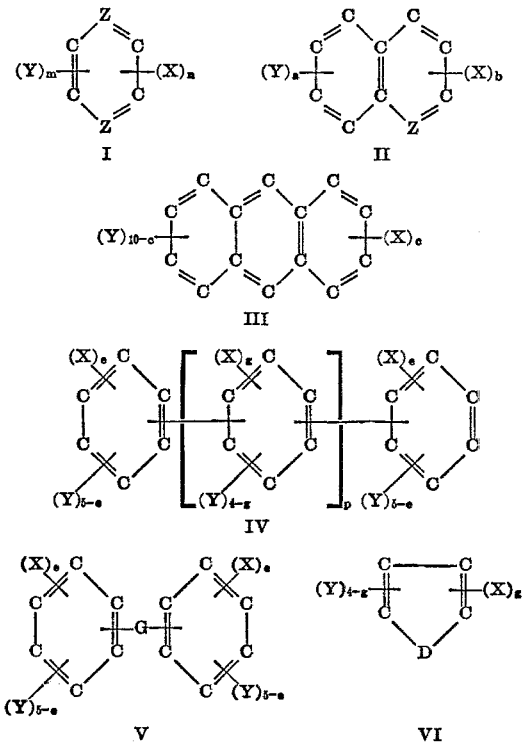

wherein each X is a halogen selected from the group consisting of chlorine, bromine, iodine, and fluorine, preferably chlorine and bromine, each Y is selected from the group consisting of hydrogen, —R, —N(R)$_2$,

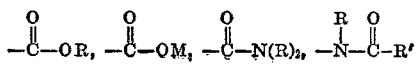

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

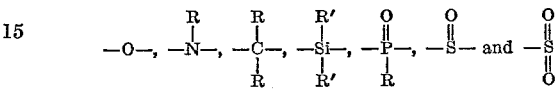

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

Representative arylene halide reactants are the following compounds: 1,2-dichlorobenzene, 1,4-dichlorobenzene, 1,4,5-tribromobenzene, N,N-dimethyl-2,5-dibromoaniline; 1,2,4,5-tetrabromobenzene, hexachlorobenzene, 1,3,5-trichloro-2,4,6 - triphenylbenzene, 1,2,4 - trichlorobenzene, methyl 2,5-dichlorobenzoate, 2,5-dichlorobenzamide, 1,4-dibromonaphthalene, 4,4'-dichlorobiphenyl, 3,4-dibromothiophene, 3,4-dichlorofuran, 3,4-difluoropyrrole, 2,5-dichloropyridine, sodium 2,5-dibromobenzenesulfonate, p,p'-dichlorodiphenyl ether; 3,3'-dichlorodiphenyl dimethylsilane; di(2-methyl-4-bromophenyl)sulfoxide, methyl di(3-ethyl-4-chlorophenyl)phosphite, 4-bromophenyl 3-n-butyl-4-chlorophenyl sulfone, and 2,6-dichloropyrazine. Because of their ready commercial availability and/or superior product preferred polyhalo-substituted aromatic compounds include 1,2-dichlorobenzene, 1,3-dichlorobenzene, and 1,2,4-trichlorobenzene. The monomers p-dichlorobenzene and 4,4'-dichlorobiphenyl produce especially useful arylene sulfide polymers and are therefore presently preferred polymer reactants in accordance with this invention.

Any polar organic compound can be employed as a solvent or dispersant which will substantially disperse under reaction conditions both the arylene halide and alkali metal sulfide reactants. Representative of such compounds are amides, lactams, and sulfones. Generally useful polar organic solvents that can be employed are such compounds as N-methyl-2-pyrrolidone, dimethylformamide, tetramethylurea, hexamethylphosphoramide, caprolactam, sulfolane, as well as low molecular weight polyamides. The amount of organic compound employed can vary widely over a wide range. Preferably, from about 0.1 liter to 2.5 liters of organic compound per gram mol of alkali metal sulfide is employed.

The arylene sulfide polymers produced by the process of this invention exhibit melting or softening points that range all the way from liquids at 25° C. to polymers melting above 400° C. Said polymers can be heat treated in the presence of oxygen or with an oxidizing agent either under vacuum or at atmospheric or super-atmospheric pressures to increase the molecular weight by either a lengthening of a molecular chain or by crosslinking, or by a combination of both to improve such properties as tensile strength. Such treatment can be effected by heating the polymer, preferably at a temperature at least as high as to be within 100° F. of the melting point of the polymer. Such treatment can be carried out while contacting the polymer with air or under vacuum. The polymers produced by the process of this invention can be molded into a variety of useful articles by molding techniques which are well known in the art. Suitable molding techniques include injection molding, compression molding, vacuum forming and extrusion.

The polymers have utility in any use where high melting point and/or high temperature stability is desired. Said polymers can contain fillers, pigments, stabilizers, softeners, extenders and other polymers, e.g., polytetrafluoroethylene. The fillers include such items as graphite, magnesia, asbestos clays, wood, glass, and the like.

The process of this invention is further illustrated by reference to the FIGS. 1 and 2 of the drawings accompanying this specification.

FIG. 1, described further in Example I, illustrates typical arylene sulfide polymer prior art process pressure and temperature conditions correlated with reaction time periods which occur in the process wherein nonincrementally an alkali metal sulfide reactant is added to an arylene halide reactant.

Figure 2:
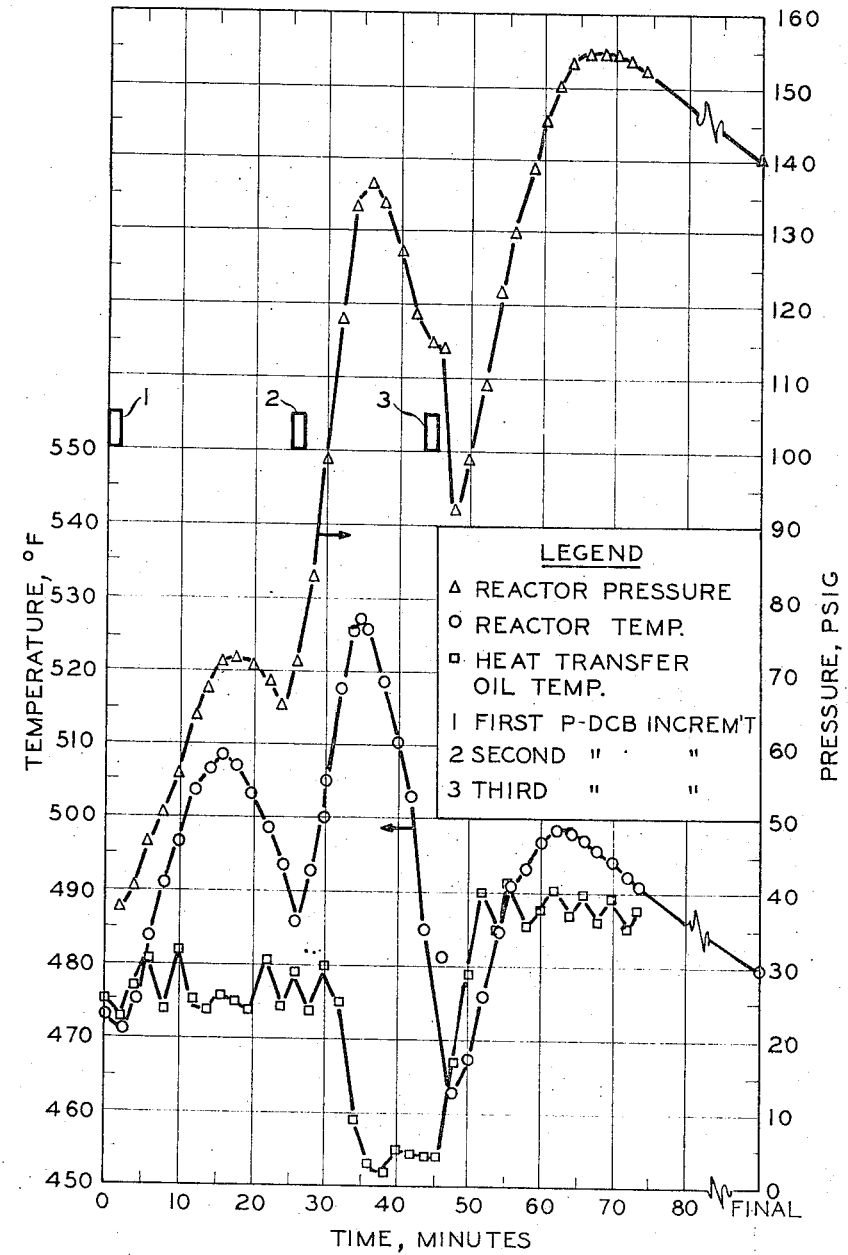

FIG. 2, described further in Example II, illustrates typical arylene sulfide polymer inventive process pressure and temperature conditions correlated with reaction time periods which occur in the process wherein incrementally an alkali metal sulfide reactant is added to an arylene halide reactant.

Set out hereafter are examples in further illustration of the invention, but which should not be construed in undue limitation thereof.

EXAMPLE I

A polyphenylene sulfide polymer was prepared in accordance with the following prior art process: commercial $Na_2S \cdot 2.6H_2O$ (approximately 2.6 mols of water per mol of sodium sulfide) was dehydrated in the presence of N-methylpyrrolidone to $Na_2S \cdot H_2O$ (approximately 1.0 mol of water per mol of sodium sulfide). Following dehydration, the quantity of p-dichlorobenzene necessary to meet the stoichiometric requirements for substantially complete conversion of the sodium sulfide reactant was added in a single unit to the monohydrated sodium sulfide/N-methylpyrrolidone solution having a temperature of about 400° F. The mixture was subsequently brought to reaction initiation temperatures of about 430° F. by contacting the reaction mixture with a heat source maintained at a temperature of about 450° F. The polyphenylene sulfide reaction became self-sustaining when the reaction temperature of about 430–440° F. was obtained as evidenced by initiation of a pressure build-up within the reaction media (see FIG. 1 for a graphic description of the rate of change of temperature (° F.) and pressure (p.s.i.g.) relative to time (minutes) of the reaction of this example). The heat input into the reaction medium was discontinued when the reaction medium reached a temperature of 460–480° F., and was re-initiated after the reaction medium temperatures peaked at about 550–560° F. As illustrated in FIG. 1, after initiation of the reaction at 400–420° F., the exothermic nature of the reaction caused a rapid increase in the reaction medium temperature to a peak temperature of about 560° F. The reaction temperature remained within a temperature range of from about 465° F. to 560° F. after reaching the peak temperature of 560° F.

As indicated by FIG. 1, runaway reaction conditions prevailed in the process of this example, as evidenced by the increase in reaction pressure to an ultimate pressure maximum of 240 p.s.i.g., as well as peak reaction temperatures of about 560° F.

EXAMPLE II

A polyphenylene sulfide polymer was prepared in accordance with the following inventive process: commercial sodium sulfide was dehydrated as in Example I, At the end of the dehydration step, three (3) incremental quantities, one-third (33⅓%) of the quantity of p-dichlorobenzene necessary to meet the stoichiometric requirements for substantially complete conversion of the sodium sulfide reactant, were added to the monohydrated sodium sulfide/N-methylpyrrolidone solution at about 473° F. The initial reaction mixture (¼ paradichlorobenzene, ¾ sodium sulfide) was subsequently brought to reaction initiation temperatures by contacting the reaction mixture with a heat source maintained at a temperature in the range of from 470 to about 480° F. (see FIG. 2 for a graphic description of the rate of change of temperature (° F.) and pressure (p.s.i.g.) relative to time (minutes) of the reaction of this example). As indicated by the graphic representation of the inventive process wherein incremental quantities of p-dichlorobenzene were added to sodium sulfide monohydrate, the exothermic nature of the reaction caused peak temperatures of 509°, 527° and 498° to occur following the addition of each increment of p-dichlorobenzene to the reaction medium. Also, as indicated in FIG. 2, that although comparable total quantities of reactants p-dichlorobenzene and sodium sulfide were contacted in the presence of comparable amounts of N-methylpyrrolidone in the processes of Examples I and II, i.e., 0.30 mole N or S per mol of N-methylpyrrolidone and 1.03 mol of p-dichlorobenzene, operating process pressure maximums were maintained at substantially reduced pressure peaks, i.e., 72 p.s.i.g., 137 p.s.i.g. and 155 p.s.i.g., which corresponded in point of time with peak temperatures noted hereinbefore.

Comparison of the graphic representations of FIGS. 1 and 2, reflecting the process conditions set out in Examples I and II hereinbefore presented, demonstrates that when incremental quantities of at least one of the reactants is charged to the reaction media the arylene sulfide polymer process can be carried out at substantially reduced operating pressures.

Further modifications of the teachings of this invention and the incremental addition of at least one arylene halide reactant to the reaction media will be apparent to those skilled in the art.

I claim:

1. In a batch process for the preparation of arylene sulfide polymers by reacting an arylene halide with an alkali metal sulfide in the presence of a polar organic compound, the improvement comprising adding to a reaction zone the desired amount of one of said arylene halide and said alkali metal sulfide and an initial amount of the other one of said arylene halide and said alkali metal sulfide; the molar ratio of said initial amount to said desired amount being in the range of from 1:10 to 1:2, and thereafter adding to said reaction zone incremental amounts of said other one, the molar ratio of each of said incremental amounts to said desired amount being in the range of about 1:10 to 1:2, the time interval between the addition of each said incremental amount being in the range of ⅒ of a minute to 24 hours.

2. A process in accordance with claim 1 wherein the molar ratio of said initial amount to said desired amount is in the range of from about 1:5 to about 1:3 of said quantity, wherein said time intervals are in the range of about 15 minutes to about 30 minutes in duration, and wherein the molar ratio of each of said incremental amounts to said desired amount are in the range of about 1:4 to 1:3.

3. A process in accordance with claim 1 wherein the molar ratio of said initial amount to said desired amount is about 1:3, wherein the molar ratio of each of said incremental amounts to said desired amount is about 1:3, wherein said time intervals are in the range of about 15 minutes to about 30 minutes, and wherein said other one is said arylene halide.

4. A process in accord with claim 2, wherein said arylene halide is selected from compounds represented by the formulas:

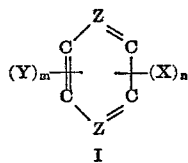 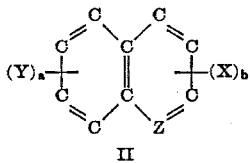

I  II

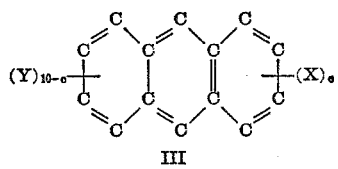

III

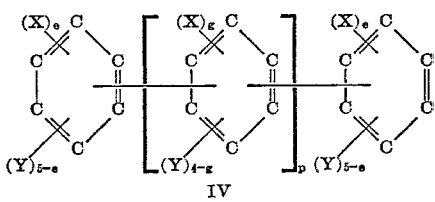

IV

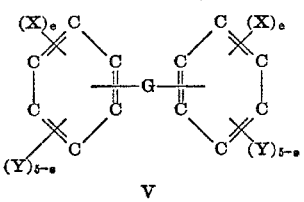 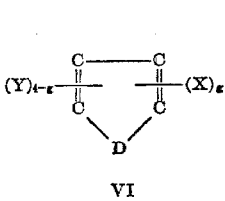

V  VI wherein each X is a halogen selected from the group consisting of chlorine, bromine, iodine, and fluorine, preferably chlorine and bromine, each Y is selected from the group consisting of hydrogen, —R, —N(R)$_2$,

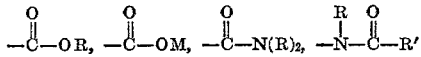

—O—R′, —S—R′, —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R′ is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

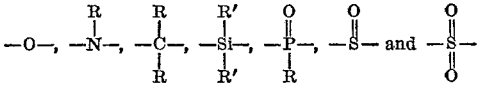

M is an alkali metal selected from the group consisting of sodium, potassium, lithium, rubidium, and cesium; n is a whole integer of from 2 to 6, inclusive; when both Z's in Formula I are —C=, m=6—n, when one Z in Formula I is —C=, m=5—n, when both Z's in Formula I are —N=, m=4—n; b is a whole integer of from 2 to 8, inclusive, when Z in Formula II is —C=, a=8—b, when Z in Formula II is —N=, a=7—b; c is a whole integer of from 2 to 10, inclusive, e is a whole interger of from 1 to 5, inclusive, g is a whole integer of from 2 to 4, inclusive, p is a whole integer selected from the group consistng of 0 to 1, and wherein said alkali metal sulfide is selected from compounds represented by the formula M$_2$S wherein M is an alkali metal selected from the group consisting of sodium, potassium, lithium, rubidium and cesium, including anhydrous and hydrous forms of said alkali metal sulfide.

5. A process in accord with claim 4, wherein said arylene halide is p-dichlorobenzene, wherein said alkali metal sulfide is sodium sulfide, and wherein said polar organic compound is N-methylpyrrolidone.

6. A process in accord with claim 5, wherein the process operating pressure is within the range of from about 0 p.s.i.g. to about 300 p.s.i.g.

References Cited

UNITED STATES PATENTS

| | | | |
|---|---|---|---|
| 3,354,129 | 11/1967 | Edmonds, Jr. et al. | 260—79.1 |
| 3,524,835 | 8/1970 | Edmonds, Jr. et al. | 260—79.1 |
| 2,553,206 | 5/1951 | Patrick | 260—79 |
| 2,676,165 | 4/1954 | Fettes | 260—79.1 |
| 2,685,574 | 8/1954 | Signaigo | 260—79.1 |

DONALD E. CZAJA, Primary Examiner

M. I. MARQUIS, Assistant Examiner

U.S. Cl. X.R.

260—37 R, 79